United States Patent
Anstey et al.

(10) Patent No.: US 7,640,852 B1
(45) Date of Patent: Jan. 5, 2010

(54) ROUND BALER BELT-TENSIONING CYLINDER ARRANGEMENT ALSO USED FOR BALE EJECTION

(75) Inventors: Henry Dennis Anstey, Ottumwa, IA (US); Daniel Eric Derscheid, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/275,617

(22) Filed: Nov. 21, 2008

(51) Int. Cl.
*B30B 5/04* (2006.01)

(52) U.S. Cl. .............................. 100/88; 100/87; 58/341

(58) Field of Classification Search ...................... 100/5, 100/87, 88, 89, 100; 56/341
See application file for complete search history.

(56) References Cited

U.S. PATENT DOCUMENTS

| | | | |
|---|---|---|---|
| 4,433,619 A * | 2/1984 | Anstey et al. | 100/40 |
| 7,140,294 B1 | 11/2006 | Anstey et al. | |
| 2005/0235842 A1 * | 10/2005 | Viaud | 100/87 |
| 2005/0241499 A1 * | 11/2005 | Viaud et al. | 100/89 |

* cited by examiner

*Primary Examiner*—Jimmy T Nguyen

(57) ABSTRACT

A large round baler is equipped with a combined belt-tensioning and bale ejecting arrangement including front and rear tensioning arm assemblies mounted at an upper front location adjacent a baling chamber. Extensible and retractable belt-tensioning actuators are coupled between the arm assemblies and serve to yieldably restrain movement of the arms, which support and or guide runs of bale-forming belts, in response to the growth of a bale being formed in the baling chamber. One end of each of the tensioning actuators is coupled to the rear arm assembly in such a way that the actuator may be cycled to move over center relative to the pivot axis of the rear arm assembly once the bale is completely formed so that the actuators may be used to aid in ejecting the bale once the discharge gate is opened.

4 Claims, 8 Drawing Sheets

ROUND BALER BELT-TENSIONING CYLINDER ARRANGEMENT ALSO USED FOR BALE EJECTION

FIELD OF THE INVENTION

The present invention relates to large round balers, and more specifically relates to combined belt-tensioning and bale ejection arrangements for such balers.

BACKGROUND OF THE INVENTION

U.S. Pat. No. 7,140,294, granted on Nov. 28, 2006 concerns a large round baler equipped with a combined tensioning and ejecting arrangement including a tensioning arm assembly located in an upper front region of opposite side walls of the baler and comprising front and rear arm assemblies having separate tensioning and ejecting actuators associated with them and operable in such a way that, after formation of a bale, the ejecting actuator may be operated to cause the rear arm assembly to sweep into the baling chamber and aid in the ejection of the bale.

It is desired to simplify this tensioning and ejecting arrangement by eliminating the need for a separate ejecting actuator while retaining the ejection function.

SUMMARY OF THE INVENTION

According to the present invention, there is provided an improvement to the above-described patented combined tensioning and ejecting arrangement.

An object of the invention is to provide a combined belt-tensioning and bale ejection arrangement wherein the tensioning actuator arrangement serves also as the bale ejection actuator arrangement, The object is accomplished by mounting the extensible and retractable hydraulic tensioning actuators between front and rear tensioning arm assemblies in a manner establishing an over-center relationship between the lines of action of the actuators and the pivot axis of the rear tensioning arm assembly in such a way that they may be cycled to first effect belt-tensioning during formation of a bale, and then for operating the rear tensioning arm assembly for aiding in the ejection of the completed bale.

According to a first embodiment, the over-center relationship is established by mounting the actuators to the rear tensioning arm assembly at an elongate opening disposed in the rear tensioning arm assembly such that, when the actuators are located at upper ends of the openings, their lines of action will be above the axis of rotation of the rear tensioning arm assembly, with the actuators extending under resistance during the formation of a bale and with the actuators retracting slightly and having their ends move to lower ends of the openings resulting in their lines of action moving over center so as to be below the axis of rotation of the rear tensioning arm assembly, when the actuators are placed in a float condition after the bale discharge gate is opened, whereby subsequent extension of the actuators, once the bale discharge gate is opened, results in the rear arm assembly being driven so as to aid in the ejection of the formed bale.

According to a second embodiment, the over-center relationship is established by providing a pair of links respectively coupled between the pair of actuators and the rear tensioning arm assembly, with the links being operable for moving the lines of action of the actuators over-center relative to the axis of rotation of the rear tensioning arm assembly after a bale is formed in the baling chamber, the pair of actuators then being operable for aiding in the ejection of the bale from the baling chamber.

This and other objects of the invention will become apparent from a reading of the ensuing description, together with the appended drawings.

DESCRIPTION OF THE PREFERRED EMBODIMENT

Figure 1:
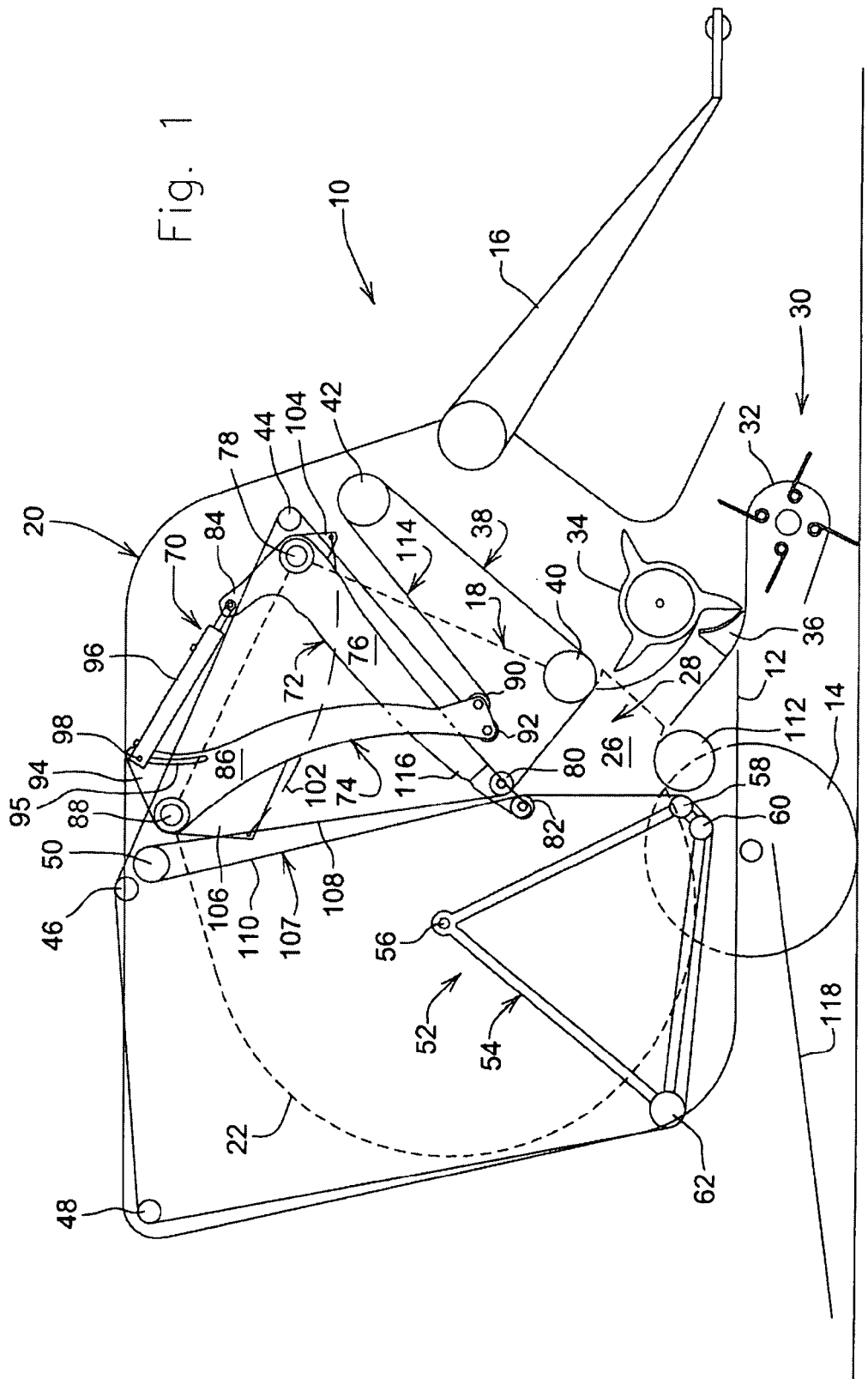
FIG. 1 is a schematic, right side view of a round baler equipped with a combined tensioning and ejecting arrangement constructed in accordance with a first embodiment of the invention, wherein tensioning cylinders have first ends coupled for moving along respective slots contained in the rear arm assembly so as to go over center relative to the pivot axis of the rear arm assembly, and with the front and rear tensioning arm assemblies being shown in respective lowered, bale starting positions.
Figure 2:
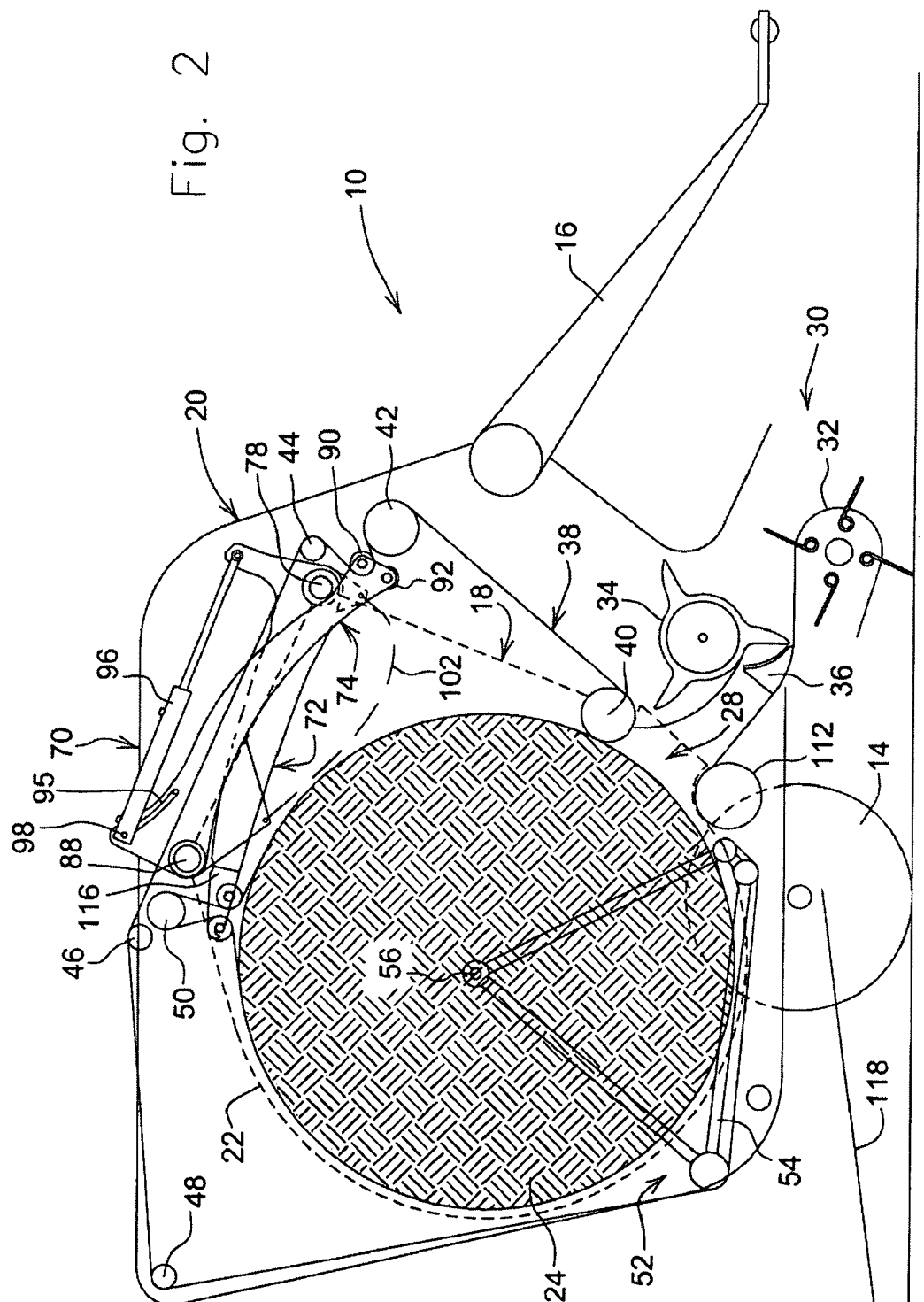
FIG. 2 is a view like that of FIG. 1, but showing a completed bale within the baling chamber, with the front and rear tensioning arm assemblies being shown in respective raised, bale completed positions.
Figure 3:
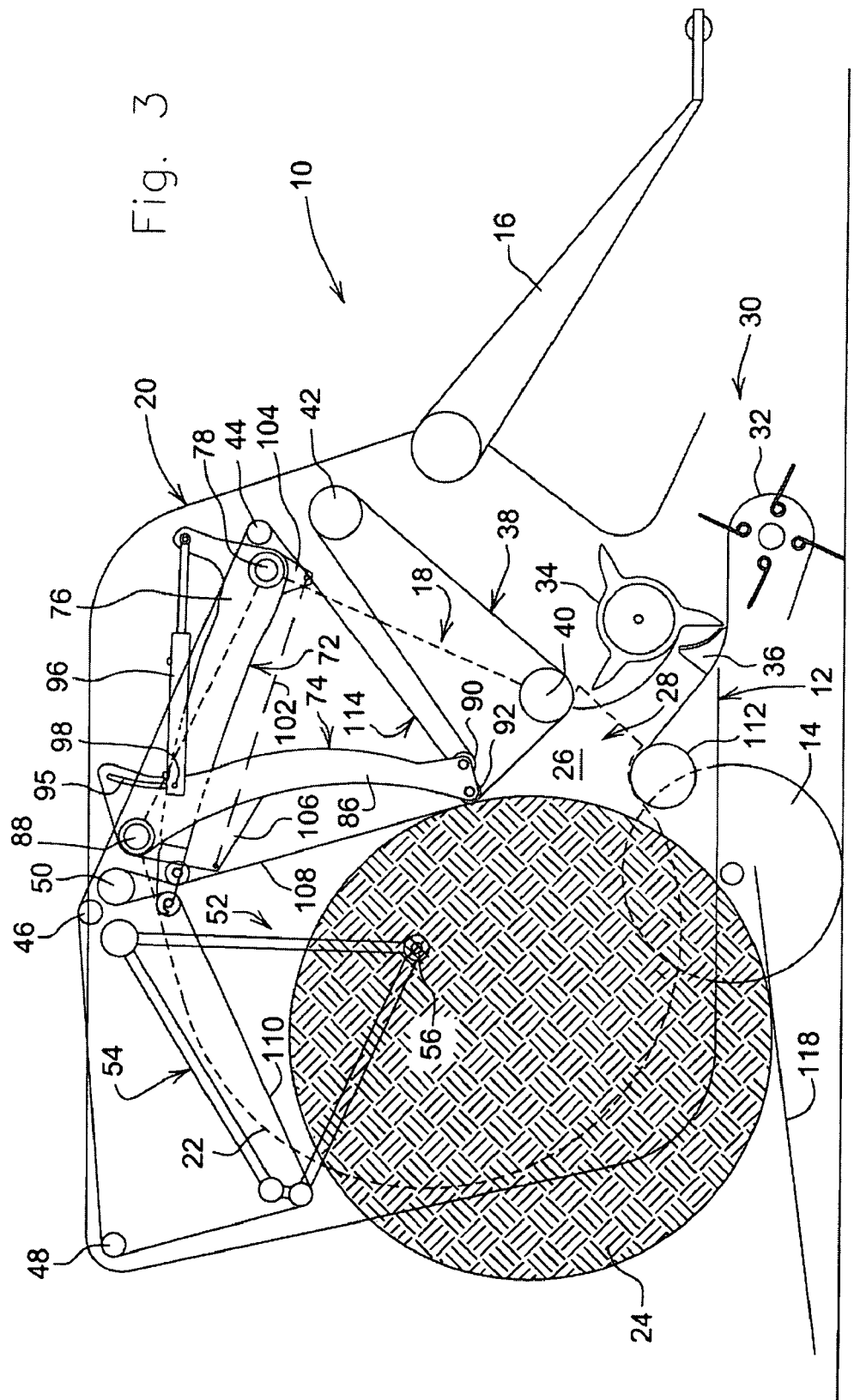
FIG. 3 is a view like that of FIG. 1, but showing the discharge gate in its raised bale discharge position, with a bale being discharged beneath it under the assistance of the rear arm assembly.

Referring now to FIGS. 1-3 of the drawings, there is shown a large round baler 10 including a chassis 12 carrying an axle on which ground wheels 14 are mounted so that the chassis 12 is supported for being towed over the ground by an agricultural tractor, not shown, coupled to a tongue 16 joined to, and projecting forwardly from the chassis 12. The chassis 12 includes a pair of transversely spaced sidewall structures including an inner pair of vertically oriented side walls 18, which are parallel to, and respectively spaced transversely from, a pair of outer sidewalls 20, with the inner walls 18, being shown only in dashed outline, for the sake of clarity. The inner sidewalls 18 have a rear region shaped so as to define a partial circular outer periphery 22 having a radius slightly larger than that of a full sized bale 24 (FIGS. 2 and 3) formed within an expansible baling chamber 26, described in more detail below, as crop is fed through an inlet 28 of the baling chamber by the action of a crop feeding arrangement 30 including a crop pick-up 32 and a feed rotor 34, which is here shown as working together with a knife arrangement 36 for cutting the crop into pieces before being baled.

Extending between and rotatably mounted at fixed peripheral locations of the outer sidewalls 20, which are beyond the peripheries of the inner pair of sidewalls 18, are a plurality of bale-forming belt support rolls, which provide support for a plurality of bale-forming belts 38 mounted in side-by-side relationship to each other across a width dimension of the rolls. Specifically, a bottom front roll 40 defines an upper border of the crop inlet 28 at a location just above a path traced by the tines of the crop feed rotor 34. Proceeding counter-clockwise from the roll 40, there is provided a lower central front roll 42 spaced upwardly and forwardly from the roll 40, an upper central front roll 44 spaced a short distance above the roll 42, a top front roll 46 spaced upwardly and to the rear from the roll 44, and a top rear roll 48 spaced rearward from the roll 46. Located a slight distance below and forward of the top front roll 46 is a roll 50. The bale-forming belt support rolls 40-50, thus far described, constitute a set of fixed rolls, with further support for the belts 38 being afforded by a plurality of rolls mounted for movement, as is described in the immediately following paragraphs.

A light weight discharge gate 52 includes triangular end members 54 respectively located between the inner and outer sidewalls 18 and 20 at the opposite sides of the baler 10. As shown in FIG. 1, the light weight discharge gate 52 is positioned in a lowered baling position, wherein each of the triangular end members 54 includes an upper corner pivotally mounted, as at 56, to the adjacent spaced sidewalls 18 and 20, and about which the light weight discharge gate 52 may pivot vertically to a discharge position, shown in FIG. 3. The pivotal mountings 56 define a horizontal transverse pivot axis which is approximately coincident with that of the full sized bale 24 positioned within the baling chamber 26, as shown in FIG. 2. The discharge gate 52 is dimensioned such that front and rear corners of each triangular end member 54 are located radially beyond the circular periphery 22 of the adjacent inner sidewall 18, with a pair of front and rear rolls 58 and 60 extending between, and being rotatably mounted to, front corner regions of the triangular end members 54, and with a roll 62 extending between, and being rotatably mounted to, rear corner regions of the triangular end members 54. The roll 60 is spaced down and to the rear from the roll 58.

Figure 4:
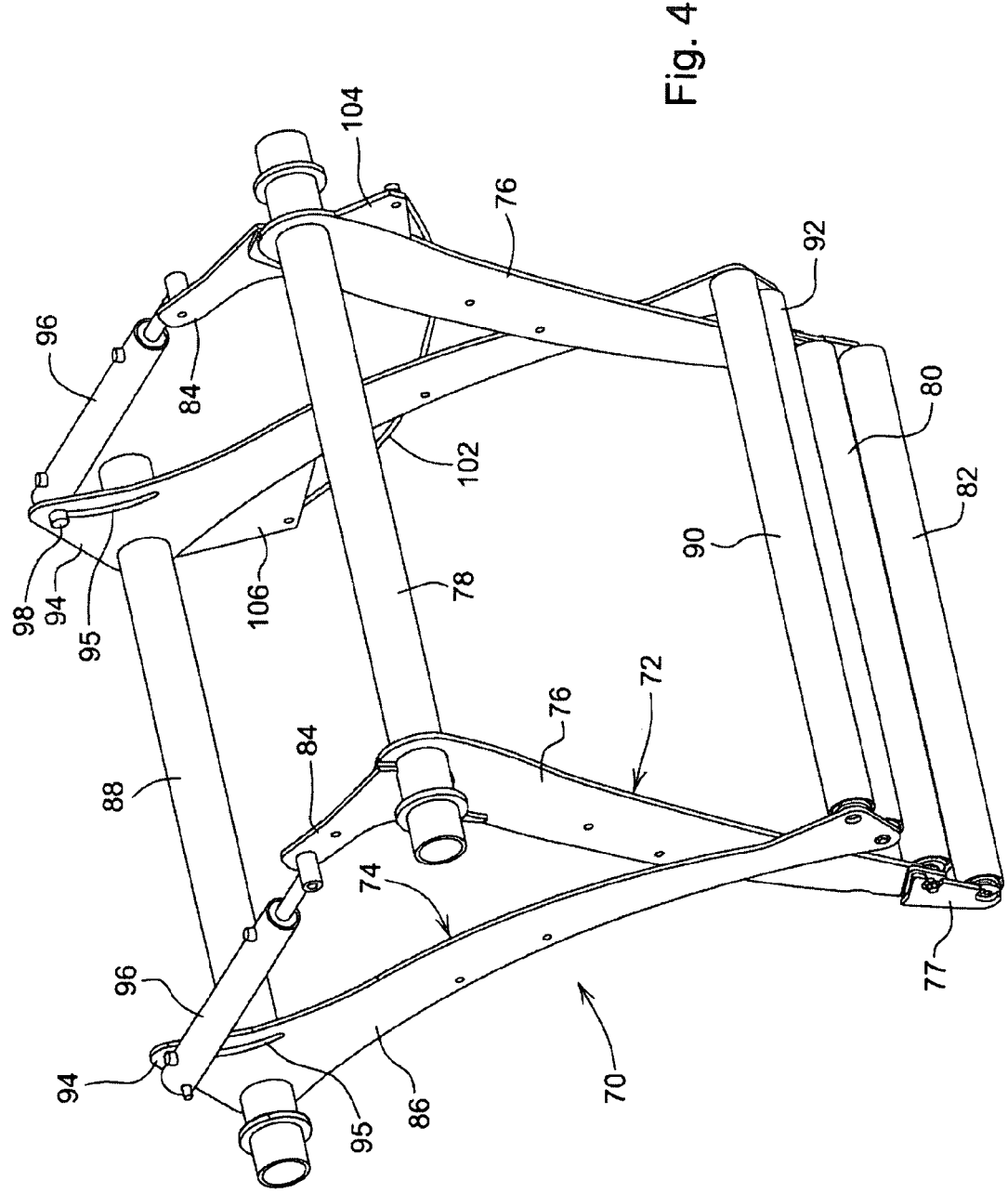
FIG. 4 is a right front perspective view of the combined tensioning and ejecting arrangement illustrated in FIGS. 1-3, with the tensioning arms being shown in their respective lowered positions shown in FIG. 1.

Referring now also to FIG. 4, it can be seen that a combined tensioning and ejecting arrangement 70 is mounted to an upper front region of the inner sidewalls 18. The arrangement 70 includes front and rear tensioning arm assemblies 72 and 74, respectively.

The front tensioning arm assembly 72 includes a pair of transversely spaced, parallel arms 76 having forward ends fixed to a support tube 78 extending between, and being mounted for rotation at, forward edges of the inner sidewalls 18 at a location spaced just to the rear of the bale-forming belt support roll 44. The arms 76 are located so that major rear sections of the arms 76 sweep respective paths spaced a short distance inwardly of the sidewalls 18, with rear end sections 77 (see FIG. 4) of the arms 76 being offset toward the sidewalls 18 so as to follow respective paths closely adjacent the sidewalls 18. Extending between, and mounted for rotation to, the rear end sections 77 of the arms 76 are front and rear belt guide rolls 80 and 82, respectively. Located at the forward ends of each of the arms 76, and disposed at approximately a right angle to a line extending through the centers of the tube 78 and rolls 80 and 82, is an actuator mounting ear 84.

The rear tensioning arm assembly 74 also includes a pair of transversely spaced, parallel arms 86, these arms having upper ends joined to a tube 88 extending transversely between, and being pivotally mounted to, upper edges of the inner sidewalls 18 at a location spaced a short distance down and forward of the fixed bale-forming belt support roll 50. The arms 86 are mounted so as to sweep a path closely adjacent the sidewalls 18 and closely adjacent the arms 76 when overlapped, as shown in FIGS. 1 and 4. Extending between, and being mounted for rotation within, lower ends of the arms 86 are a front belt guide roll 90, and a rear belt-engaging roll 92, the latter reducing scuffing, in a manner described below. Provided at the upper end of each of the arms 86 and disposed at approximately a right angle to a line extending through the center of the tube 86 and the belt guide roll 90 is an actuator mounting ear 94.

Up to this point, the combined tensioning and ejecting arrangement 70 is identical to that disclosed in the aforementioned U.S. Pat. No. 7,140,294. The arrangement 70 described here differs from that contained in the patent by providing each of the mounting ears 94 with an elongate slot 95 that is oriented substantially vertically, as viewed in FIG. 1, and extends from an upper location in the ear 94, which is spaced above the tube 88, to a location in the associated arm 86 which is below a horizontal transverse axis of rotation defined by the mounting of the tube 88 to the baling chamber inner side walls 18.

Control of the front and rear tensioning arm assemblies 72 and 74 is achieved by a pair of double-acting, extensible and retractable hydraulic tensioning actuators 96, respectively coupled between the mounting ears 84 and 94 at the opposite sides of the assemblies, with the coupling of each actuator 96 to the mounting ears 94 being by a connecting element 98 located in the curved slot 95. An elongate flexible down stop 102, here shown as a cable, is coupled between a mounting ear 104 provided on a forward region of the left arm 76 adjacent the support tube 78, and a mounting ear 106 provided on a bottom region of the left arm 86 adjacent the support tube 88. A spring or other device (not shown) may be provided for taking up the slack in the cable so that it does not interfere with operation of other parts of the baler 10.

Instead of the cylinder mounting ears 84 and 94 being formed integrally with the pairs of arms 76 and 84, and the down stop mounting ears 104 and 106 being respectively integral with the left arms 76 and 86, respective mounting ears (not shown) may be appropriately fixed to opposite end regions of each of the support tubes 78 and 88. Further, instead of a pair of tensioning actuators 96, a single actuator could be coupled between crank arms respectively provided at central locations between opposite ends of the support tubes 78 and 88. Also, in lieu of the direct connections between the actuators 96 and the arm assemblies 72 and 74, the actuators could be connected through means of levers mounted to the arm assemblies for pivoting freely in one direction and for engaging stop pins when pivoted in an opposite direction, with the levers having the actuators 96 coupled to them.

With reference to FIG. 1, it can be seen that a loop 107 of the baling belts 38 extends about the roll 50 and includes front and rear runs 108 and 110, respectively, that pass between the guide rolls 80 and 82 carried at the end of the front tensioning arm assembly 72. The front run 108 extends from the front guide roll 80 to a lower region of the lower front support roll 40, while the rear run 110 passes about front and lower regions respectively of the rolls 58 and 60 carried at the lower front corner region of the light weight discharge gate 52. It can be seen that a bale support roll 112 is located just forward of the roll 58 and defines a rear side of the crop inlet 28. When the baling chamber 26 is empty, as shown in FIG. 1, the front arm assembly 72 is positioned in its lowered position, wherein the guide rolls 80 and 82 effectively close the top of the baling chamber 26 so as to form a relatively small, wedge-shaped space, sized conducive for starting a bale. At this time, only a minimal length of the belts 38 is required for engaging the forming bale, with the excess length being contained in a loop 114 located between the central front rolls 42 and 44, and held by the guide roll 90 carried at the end of the rear arm assembly 74, with the arm assembly 74 then extending downwardly in overlapping relationship to the front arm assembly 72. The hydraulic actuators 96 are contracted at this time, with the connecting element 98 at the rear of each actuator being located in an upper end of an associated one of the slots 95. Through the agency of a variable pressure relief valve (not shown) located for resisting the flow of fluid from the rod ends of the actuators 96, as is well known, upward movement of the tensioning arm assemblies 72 and 74 is yieldably resisted. As crop is fed into the baling chamber 26 by way of the baling chamber inlet 28, the belt runs 108 and 110, which respectively travel upward and downward, cause the crop to be rolled into a bale, with the size of the bale increasing, resulting in the front arm 72 pivoting clockwise and in the rear arm assembly 74 pivoting counterclockwise. When a full sized bale has been formed, as shown in FIG. 2, the entire loop 114 of the belts 38 will be substantially depleted, with the rear tensioning arm assembly 74 being in engagement with the support tube 78. At the same time, the front arm assembly 72 will have raised to the extent that the guide rolls 80 and 82 are near the fixed support roll 50, and to the extent that an arcuate stop surface 116 provided on the top edge of the arms 76 is close to engagement with the support tube 88. At this time, the actuators 96 will be substantially fully extended. Springs (not shown) could be used in addition to the actuators 96 for yieldably resisting upward movement of the arm assemblies 72 and 74.

Once a full sized bale 24 is formed in the baling chamber 26, the bale 24 may be discharged by effecting clockwise rotation of the light weight discharge gate 52 through the action of one or more hydraulic actuators (not shown) coupled between the sidewalls 18 and/or 20 and the discharge gate 52 so as to move the discharge gate 52 from its lowered baling position, shown in FIG. 1, to its raised discharge position, shown in FIG. 3. The completed bale 24 is then free to fall onto an unloading ramp 118 provided beneath the baling chamber.

Upon the discharge gate 52 being raised, the actuators 96 are placed in a float condition and tension in the baling belts 38 is released. This results in the connecting elements 98 moving to the lower ends of the slots 95 while at the same time resulting in the actuators 96 retracting a small amount. Once the connecting elements 98 are in the lower ends of the slots 95, as shown in FIG. 3 (a sensor, not shown, could be provided for alerting an operator that this movement has occurred), the actuators 96 are extended. Because the line of action of the actuators 96 is now below the pivot axis of the rear arm assembly 74, extension of the actuators 96 will cause the rear arm assembly 74 to pivot clockwise with the roll 92 engaging and rolling in a scuff-free manner along the rear side of the front run of belts 108 of the loop 107 so as to bring the run 108 into contact with a central front region of the bale 24 and exert a force positively ejecting the bale 24 out of the baling chamber 26. Therefore, any hesitation of the bale 24 to being discharged due to becoming wedged between the inner sidewalls 18 is avoided. At the time the arm assembly 74 is acting to eject the bale 24, it is also acting to remove any slack in the belts 38 which results when the bale 24 leaves the baling chamber, with it being noted that the loop 114 is once again formed containing a maximum length of the belts 38. However, during lowering the discharge gate 52 back to its baling or closed position, extra belt slack occurs and the down stop 102 then acts to prevent the rear arm assembly 74 from coming into contact with the front roll 80 of the front arm assembly 72.

Once the bale 24 is ejected, the discharge gate 52 is returned to is lowered, baling position, with the actuators 96 then being retracted resulting in the front arm assembly being lowered to its baling position shown in FIG. 1 and in the connecting elements 98 of the actuators 96 moving to upper ends of the slots 95 so that the lines of action of the actuators 96 are once again above the pivot axis of the rear arm assembly 74.

Figure 5:
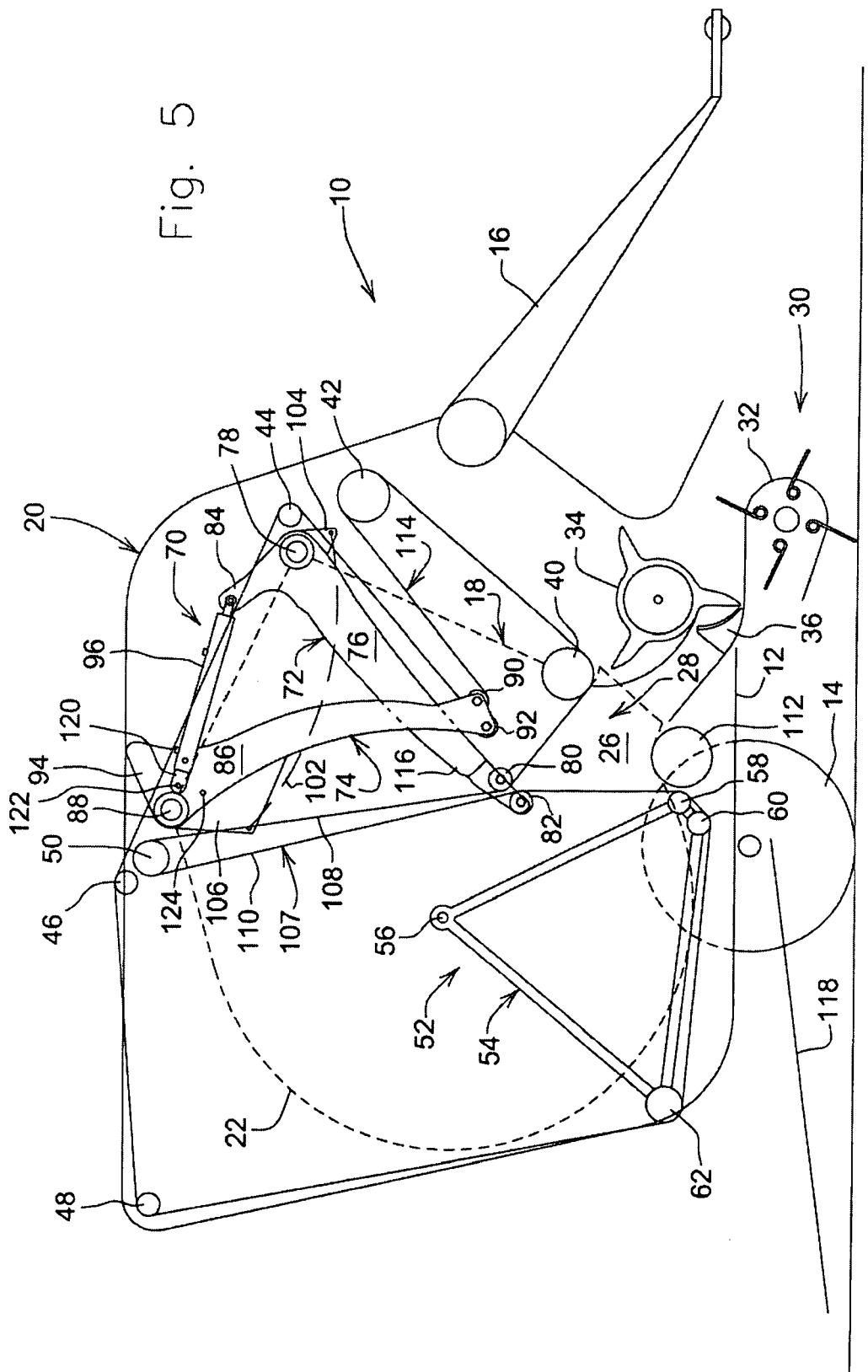
FIG. 5 is a view like that of FIG. 1, but showing a second embodiment of the present invention wherein links are used to establish the connections between the actuators and the rear arm assembly which permit the lines of action of the actuators to move over center relative to the pivotal axis of the rear tensioning arm assembly so that the actuators may be used to swing the rear arm assembly for aiding in the ejection of a bale.

Referring now to FIGS. 5-8, there is shown a second embodiment of the combined tensioning and ejecting arrangement, wherein, instead of the rear ends of the actuators 96 being attached to the arms 86 by connecting elements received in elongate slots, the actuators 96 are connected to the arms 86 by links 120 that are sized and located relative to the pivot axis of the mounting tube 88 so that, when the arm assemblies 72 and 74 are in their lowered positions, as shown in FIG. 5, the links 120 project forwardly from respective pivot connections 122 with the arms 86 of the rear assembly 74 so as to be in substantial axial alignment with the associated actuator 96 and with the pivot axis of the rear arm assembly 74. The actuators 96 are substantially fully contracted at this time.

Figure 6:
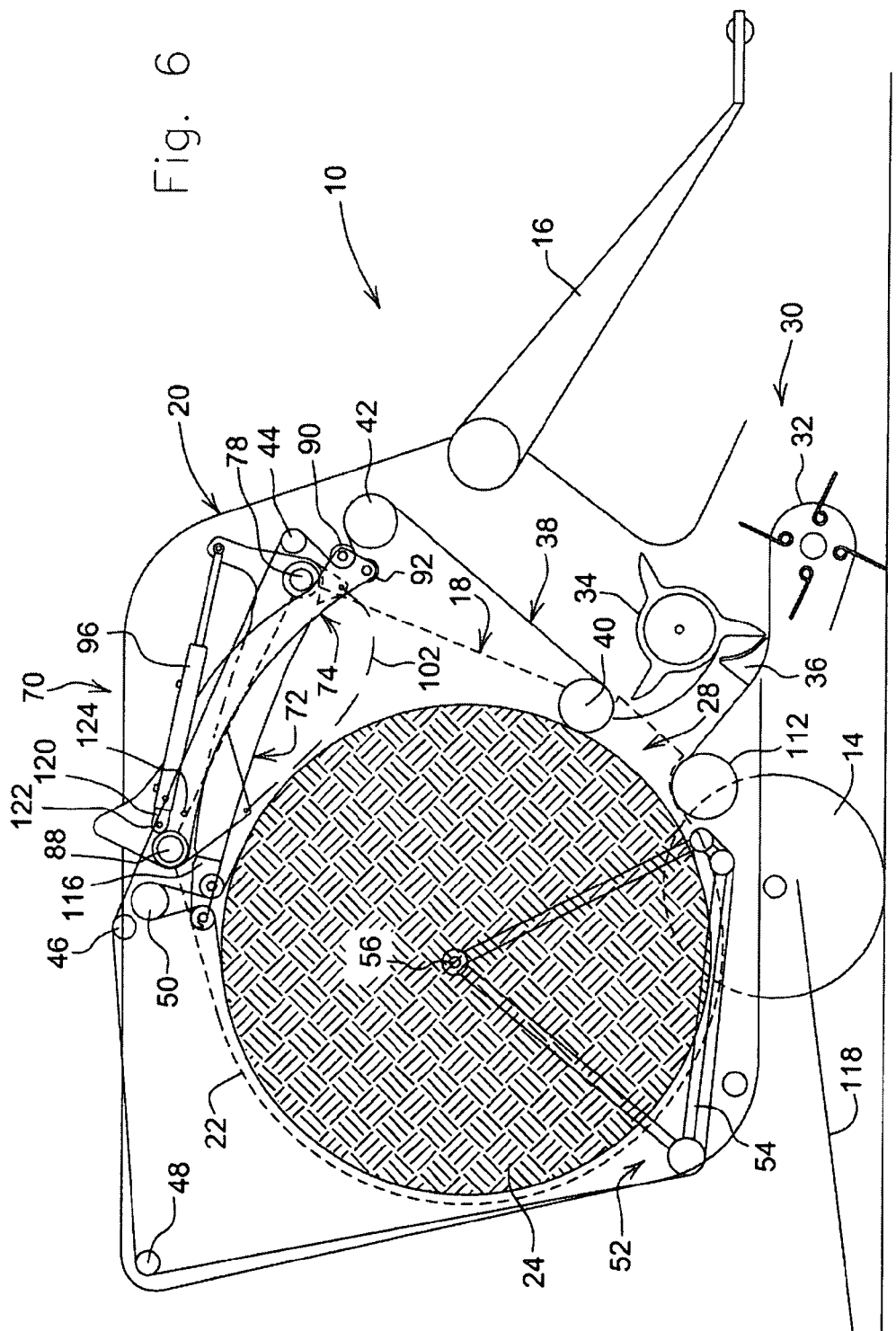
FIG. 6 is a view like that of FIG. 5, but showing a completed bale within the baling chamber.

As a bale grows in the baling chamber 26, against the resistance afforded by the actuators 96, it will press upwardly on the arms 76 of the front arm assembly 72, causing the arm assembly to rotate clockwise about the pivot axis of the front arm assembly 72. At the same time, tensile forces in the bale-forming belts 38 will act through the belt loop 114 to effect counterclockwise rotation of the rear arm assembly 74 about its pivot axis. The net result is that when the bale 24 reaches its complete diameter, as shown in FIG. 6, the line of action of each of the actuators 96 is above the pivot axis of the rear arm assembly 74.

The actuators 96 are then placed in a float condition which results in the rear ends of the actuators 96 and the links 120 gravitating downwardly until the links come into contact with respective stop pins 124 provided on each of the arms 86 such that the lines of action of the actuators 96 are now below the pivot axis of the rear arm assembly 74.

Figure 7:
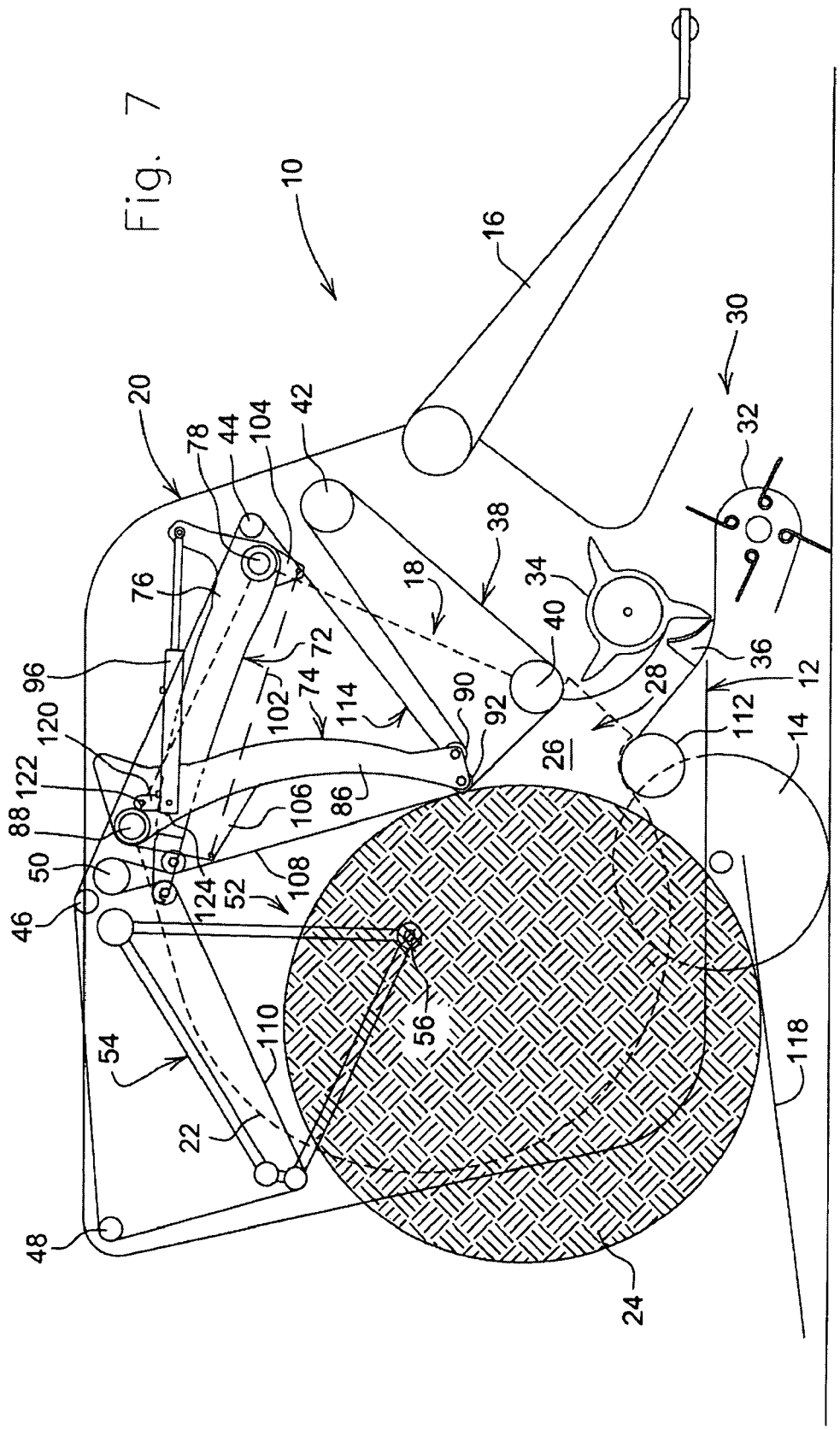
FIG. 7 is a view like that of FIG. 5, but showing the discharge gate in its raised bale discharge position, with a bale being discharged beneath it under the assistance of the rear arm assembly.
Figure 8:
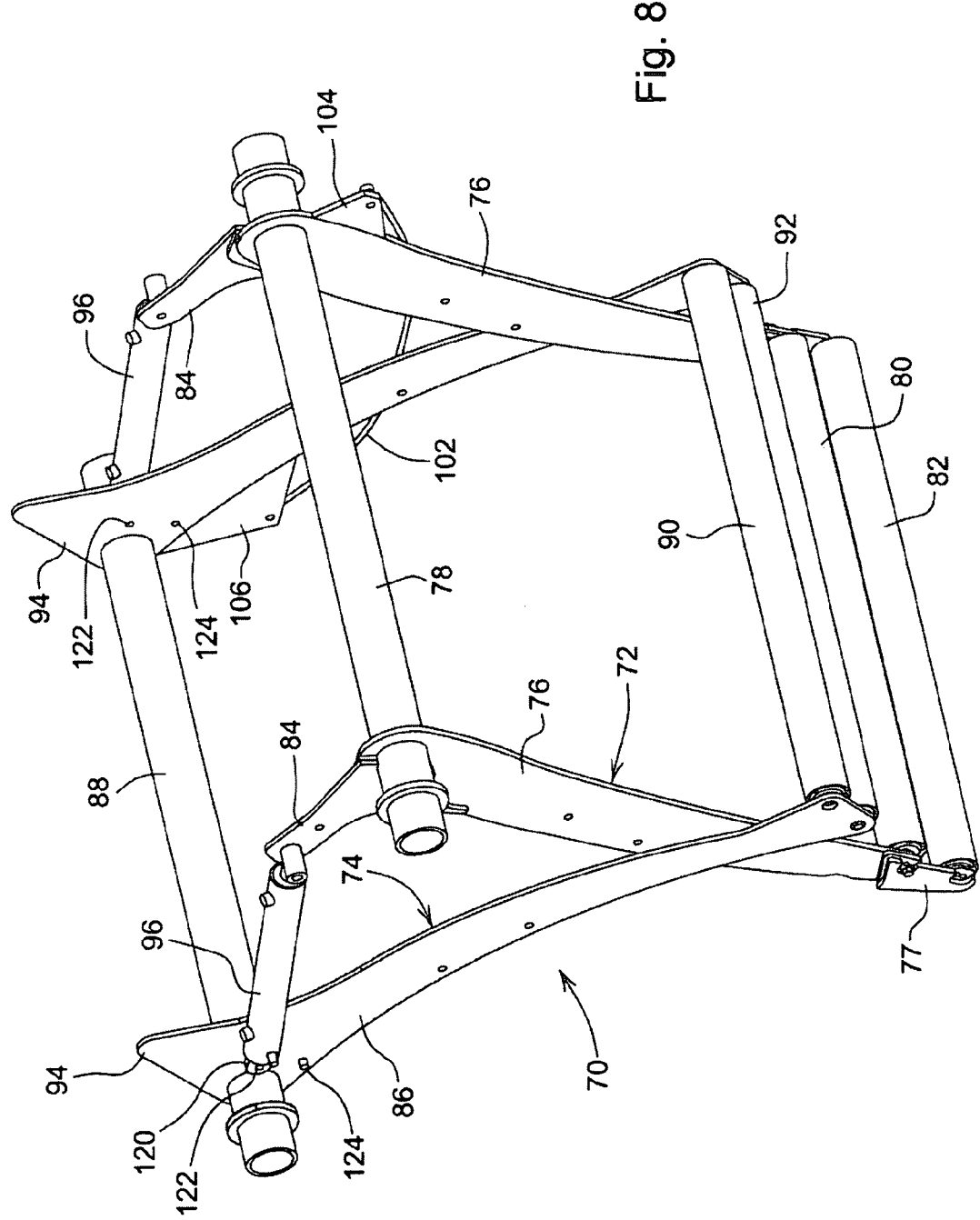
FIG. 8 is a right front perspective view of the combined tensioning and ejecting arrangement illustrated in FIGS. 5-7, with the tensioning arms being shown in their respective lowered positions shown in FIG. 5.

After the discharge gate 54 is moved to its raised discharge position, as shown in FIG. 7, the actuators 96 are extended to effect downward pivoting movement of the rear arm assembly 74 so that it sweeps the belt run 108 into engagement with the bale 24 so as to aid in the ejection of the bale.

Once the bale is ejected, the actuators 96 are once again contracted, first causing the links 120 to be pivoted upwardly away from the stop pins 124 until they become aligned with the with the actuators 96, with further contraction of the actuators then resulting in the front arm assembly 72 pivoting downwardly to its lowered position shown in FIG. 5, with the tensioning arm assemblies 72 and 74 then both being in position for starting a new bale.

Having described the preferred embodiment, it will become apparent that various modifications can be made without departing from the scope of the invention as defined in the accompanying claims.

The invention claimed is:

1. In a large round baler including a baling chamber defined in part by a plurality of bale forming belts supported in sideby-side relationship across a plurality of fixed rolls supported by opposite sidewall structures, and by a plurality of movable rolls including rolls carried by a discharge gate pivotable between a lowered baling position and a raised discharge position, and at least one tensioning arm assembly mounted to said sidewall structures for pivoting vertically and carrying at least one bale-forming belt guide roller for engaging the bale-forming belts at a location between two adjacent ones of said plurality of fixed rolls, said discharge gate includes triangular end members, said at least one tensioning arm assembly being located for pivoting about a horizontal axis between a lowered position corresponding to a bale-starting condition, wherein said baling chamber is empty and said discharge gate is in its lowered baling position, and a raised position corresponding to a bale-completed condition, wherein said baling chamber contains a completed bale, at least one extensible and retractable tensioning actuator being coupled to said at least one tensioning arm assembly for resisting movement of said at least one tensioning arm assembly between its lowered and raised positions, the improvement comprising: a connection arrangement coupling one end of said at least one tensioning actuator to said at least one tensioning arm assembly such that, once said at least one tensioning arm assembly moves to its raised position, said at least one actuator is actuated so that a line of action of said at least one actuator moves over center relative to said axis and below said axis, and said one end of said at least one tensioning actuator moves from a position above said horizontal axis to a position below said horizontal axis, whereupon said at least one actuator is operated to effect downward movement of said at least one tensioning arm assembly so that it aids in ejecting the bale, once said discharge gate is raised to its discharge position, so that said at least one tensioning arm assembly acts to forcibly eject said completed bale.

2. The large round baler, as defined in claim 1, wherein said connection arrangement includes a slot provided in said at least one tensioning arm assembly so as to extend upwardly from a lower end and a coupling element carried by said at least one tensioning actuator and received for moving along said slot, with the latter being disposed relative to said axis such that the line of action of said at least one actuator moves from above to below said axis when said coupling element moves between an upper end and said lower end of said slot.

3. The large round baler, as defined in claim 1, wherein said connection arrangement includes a link coupled between said at least one tensioning actuator and said at least one tensioning arm assembly, with said link being so located relative to said axis that pivotal movement of said link relative to said at least one tensioning arm results in said line of action moving from above to below said axis when said at least one actuator is placed in a float mode after said at least one tensioning arm assembly moves to said raised position from said lowered position.

4. The large round baler, as defined in claim 1, wherein said at least one tensioning arm assembly is mounted for pivoting clockwise about said axis when moving from said raised position to said lowered position; said plurality of fixed bale-forming belt support rolls including a third roll located above said baling chamber and having said bale-forming belts looped thereabout so as to define front and rear runs of said bale-forming belts; a second tensioning arm assembly carrying second and third belt guide rolls spaced close to each other, with said front and rear runs of said bale-forming belts passing between, and cooperating with, said second and third belt guide rolls to form a top of said baling chamber when said chamber is empty; said second tensioning arm assembly being mounted for pivoting counterclockwise about an axis located forward of said baling chamber when moving from a raised position, corresponding to when the completed bale is contained in the baling chamber, and a lowered position, corresponding to when said baling chamber is empty; and said at least one tensioning actuator being coupled between said at least one tensioning arm assembly and said second tensioning arm assembly so as to resist movement of said at least one and second tensioning arm assemblies from their respective lowered positions to their respective raised positions as a forming bale enlarges said baling chamber.

* * * * *